UNITED STATES PATENT OFFICE.

HENRY DREYFUS, OF BASEL, SWITZERLAND.

CELLULOSE ACETATE AND PROCESS OF MAKING SAME.

1,280,974.  Specification of Letters Patent.  Patented Oct. 8, 1918.

No Drawing.  Application filed May 4, 1915. Serial No. 25,820.

*To all whom it may concern:*

Be it known that I, HENRY DREYFUS, a citizen of the Republic of Switzerland, residing at Basel, Switzerland, have invented Cellulose Acetates and Processes of Making Same, of which the following is a specification.

This invention relates to the manufacture by direct acetylation, of cellulose acetates insoluble in chloroform even on addition of alcohol, and also of cellulose acetates insoluble in chloroform but soluble therein on addition of alcohol; and also of the products of further transformation of these said acetates.

In French Patent No. 432046 and its addition 16494 and in my United States application 126502 filed October 19, 1916, and in my United States patent of February 27, 1917, No. 1217722, I have described a process of producing by direct acetylation, acetates of cellulose which are insoluble in chloroform, but soluble (and preferably easily soluble) by the addition of alcohol to the chloroform; also I have described the methods of transforming these products into products having other solubilities, by a later treatment, as described in said United States application S. 126502.

According to the process of my application 103862, being partly a continuation of the present application, I have found also that acetates of cellulose can be produced by direct acetylation, which are insoluble in chloroform, which do not dissolve in chloroform on the addition of alcohol, even when warm, although they may become plastic or semi-fluid in chloroform on addition of alcohol.

These new direct acetylation products of my application 103862 are obtained if in the acetylation process, for example using sulfuric acid as a condensing agent, the acetylating mixture is cooled to a temperature as low as possible before introducing the cellulose to be acetylated, and if the temperature is not thereafter allowed to rise above 20 or 25° C., the reaction being interrupted at the time when a test portion of the nearly clear solution demonstrates the insolubility in chloroform on addition of alcohol. If one allows the temperature to rise above 20 or 25° C., products insoluble in chloroform are obtained, but these products are also soluble in alcohol-chloroform, and constitute for example products of French Patent 432046.

In my application 103862 I have shown that the new products insoluble in chloroform and in alcohol-chloroform can be transformed in the same manner which is indicated in |my said United States Patent 1217722, into products having other solubilities, if one submits the said products to a later treatment, in their original acetylation solution, or in other appropriate solutions, with or without the addition of water, or acids or acid salts (or a mixture of two or more of these) and finally interrupting the reaction at the different phases, where the desired solubilities exist. The indications in detail, concerning the addition of water in certain proportions or other suitable bodies, or the changes brought about by the addition of acids, such as sulfuric acid, etc., are given in my co-pending application 126502, and accordingly it is not necessary to repeat the same here.

By this later treatment I have shown that one is able to obtain certain acetates of cellulose which even by the subsequent treatment do not become soluble in pure acetone, but remain as the products of departure soluble only in diluted acetone, while others possess a solubility in pure acetone.

On the other hand I have also shown that in employing other condensing agents instead of sulfuric acid, it is evident that the limits of temperature can be changed, and that for certain condensing agents, it is necessary even to apply heat for producing a reaction product having these properties. In other words the temperature at this stage must be selected with reference to the condensing agent employed. Now I have found that neither for the production of cellulose acetates insoluble in chloroform but soluble upon addition of alcohol thereto, nor for the production of the cellulose acetates insoluble in chloroform and in alcohol-chloroform, has pure bisulfate of sodium which has been prepared in such a manner that it does not contain free acid, any acetylating action itself even at high temperatures, such as 70° C. The same is true for other acid salts of sulfuric acid, with the exception of the acid, sulfuric acid, salts of aromatic amins, such as bisulfate of anilin etc., which however possess no technical interest, since the solutions obtained therewith, as well as the products precipitated from these solutions become colored owing to the oxidation of the aromatic amins. It is practically impossible to completely remove this coloration from the precipitated products.

I have found however that it is possible to effect the required acetylation even in the cold, with sodium bisulfate or other bisulfates (except bisulfates of aromatic amins) which contain more or less small quantities of free sulfuric acid. In order to attain this result, free sulfuric acid contained in an acetylating mixture (e. g. glacial acid and acetic anhydrid) can be partly neutralized by treating the acid containing liquid with a neutralizing agent, such as sodium carbonate or anhydrous sodium acetate (which latter will react with the free sulfuric acid, with the liberation of acetic acid in place of the major portion of the sulfuric acid), always employing a quantity of the sodium compound or neutralizing agent insufficient for complete conversion of the free sulfuric acid into sodium bisulfate, that is to say employing for example 2 or 5 or 10 or 20% etc., less of the carbonate or acetate than would theoretically be necessary to convert all the free sulfuric acid contained in the acetylating mixture into bisulfate. In this way the reaction can be effected even at ordinary temperature, although it is sometimes necessary to slightly cool, and the more so the larger the amount of free sulfuric acid in the acetylating mixture, that is to say the more one diminishes the quantity employed, from the quantity theoretically necessary of the sodium carbonate or acetate.

This process offers a great technical advantage, in that one can avoid the energetic cooling which is necessary in employing sulfuric acid alone. It is possible in some cases thus to proceed without artificial cooling or in any case to be able to regulate the reaction and the temperature by appropriate cooling, by means of water of ordinary temperature, and in some cases it may be advantageous to heat in order to accelerate the reaction, and even a strong heating if the quantity of free sulfuric acid remaining is very small. Instead of bisulfate of sodium, one can also employ other bisulfates such as bisulfate of potassium or of pyridin, etc.

The result of the present invention is the more surprising as in employing small quantities of sulfuric acid alone, such as .5 or 1% or even 3% or more, and introducing the cellulose into the acetylating mixture, although an acetylation takes place, there result more or less milky, gelatinous masses, more or less permeated with fibers, or briefly, products which are absolutely useless. If on the contrary one employs quantities of bisulfate of sodium representing together with said small percentage of free $H_2SO_4$, the quantity of sulfuric acid generally employed for a good acetylation, such for example as 15% sulfuric acid or more calculated upon the weight of the cellulose employed, solutions can be obtained which are very viscous and absolutely clearing giving products of the greatest value. By employing bisulfate of sodium or other bisulfates as mentioned, it is possible to obtain without cooling cellulose acetates of the kind described in my application 103867, insoluble in chloroform and in mixtures of chloroform and alcohol by precipitating when a test portion shows this insolubility, while by prolonging the reaction one can produce products insoluble in chloroform but soluble therein on addition of alcohol, of the nature described in my application 126502.

I have found that the employment of previously prepared sodium bisulfate or other bisulfates, that is to say the introduction of finished bisulfate into the acetylating mixture of glacial acetic acid and acetic anhydrid presents difficulties, as the previously prepared bisulfate can only be dissolved with great difficulty and incompletely in the acetylating mixture. On the other hand if one prepares sodium bisulfate direct in the acetylating mixture for example by first introducing sulfuric acid in determined quantities, and afterward sodium acetate or carbonate (anhydrous) a clear solution without any deposit whatever can be readily obtained.

The cellulose acetates obtained as hereinbefore described can be treated in accordance with the processes described in my application 126502 in order to change their solubilities whether the cellulose esters are precipitated from their solutions and submitted to a further treatment, or the reaction is allowed to proceed in the solution direct from the acetylation reaction, or any equivalent solution, which contains the said cellulose esters, insoluble in chloroform and in chloroform-alcohol or insoluble in chloroform, but soluble upon the addition of alcohol, after adding water or other agents capable of preventing further acetylization, but incapable of preventing the further reaction for the production of the changes in solubility. The amount of water used may be 5%, 10%, 20%, 30%, or 50%, or even more, depending upon the particular solubilities desired, the quantity of water present having an effect on the solubilities developed by the said treatment as explained in the specification of my Patent 1217722.

*Example.*

An acetylating mixture prepared in the following manner: 400 parts of glacial acetic acid, and 300 parts of acetic anhydrid are mixed with 15 to 18 parts of concentrated sulfuric acid, and to this mixture one adds 6.5 to 8 parts of anhydrous sodium carbonate (or an equivalent quantity of sodium acetate); into the solution thus obtained 100 parts of cellulose (for example cotton, having a moisture content preferably, but not necessarily, of about 3 to 6%) are introduced and the generation of heat by the reaction is regulated conveniently, by cooling with water. After the solution becomes clear, one can heat gently, for completing the reaction. The product, either in a precipitated form, or in solution, may be treated in the same manner as described in my application 126502 or my Patent 1,217,722.

What I claim and desire to secure by Letters Patent is:—

1. The herein described process of producing cellulose acetate, which comprises reacting upon cellulose with an acetylizing solution containing acetic anhydrid and a condensing agent comprising a relatively large amount of a bisulfate and a relatively small amount of free sulfuric acid.

2. The herein described process of producing cellulose acetate, which comprises reacting upon cellulose with an acetylizing solution containing acetic anhydrid and a condensing agent comprising a relatively large amount of a bisulfate and a relatively small amount of free sulfuric acid, cooling in a less degree being employed the less the amount of free sulfuric acid present and even heating being employed in the case of very small quantities of free sulfuric acid.

3. A process of making cellulose acetate which comprises first (a) producing an acetylizing mixture by (a') mixing together acetic anhydrid, glacial acetic acid and sulfuric acid, ($a^2$) adding thereto a material containing a neutralizing agent in a form capable of uniting with the sulfuric acid to form a bisulfate, said material being in amount sufficient to convert the major portion only of the sulfuric acid into bisulfate, and leaving a small amount of uncombined sulfuric acid, (b) thereafter bringing cellulose and said acetylizing solution together, and (c) allowing the same to react.

4. A process of making cellulose acetate which comprises first (a) producing an acetylizing mixture by (a') mixing together acetic anhydrid, glacial acetic acid and sulfuric acid, ($a^2$) adding thereto a material containing a neutralizing agent in a form capable of uniting with the sulfuric acid to form a bisulfate, said material being in amount sufficient to convert the major portion only of the sulfuric acid into bisulfate, and leaving a small amount of uncombined sulfuric acid, (b) thereafter bringing cellulose and said acetylizing solution together, and (c) allowing the same to react, cooling in a less degree being employed the less the amount of free sulfuric acid present and even heating being employed in the case of very small quantities of free sulfuric acid.

5. A process of making cellulose acetate which comprises first (a) producing an acetylizing mixture by (a') mixing together acetic anhydrid, glacial acetic acid and sulfuric acetate, ($a^2$) adding thereto an amount of anhydrous sodium acetate capable of reacting with the sulfuric acid to convert the major part of the latter into sodium bisulfate, and leave a small amount of uncombined sulfuric acid, (b) thereafter bringing the cellulose and said acetylizing solution together, and (c) allowing the same to react, cooling in a less degree being employed the less the amount of free sulfuric acid present, and even heating being employed in the case of very small quantities of free sulfuric acid.

6. A process of making cellulose acetate which comprises (a) producing an acetylizing mixture by (a') mixing together 300 parts of acetic anhydrid, 400 parts of glacial acetic acid and 15 to 18 parts of concentrated sulfuric acid, ($a^2$) adding thereto an amount of anhydrous sodium acetate, capable of reacting with the major portion only of the sulfuric acid and producing sodium bisulfate, (b) introducing into the acetylizing mixture thereby produced 100 parts of cellulose, (c) allowing the cellulose and acetylizing mixture to react, cooling in a less degree being employed the less the amount of free sulfuric acid present and even heating being employed in the case of very small quantities of free sulfuric acid.

7. In the process of making cellulose acetates, the herein described mode of preparing the acetylizing solution, comprising producing a mixture of glacial acetic acid, acetic anhydrid and free sulfuric acid, and adding thereto a dry agent capable of reacting with sulfuric acid to form bisulfate, and which is added in amounts sufficient to produce a bisulfate from the major part of the sulfuric acid present and to leave a relatively small amount of uncombined sulfuric acid.

8. A solution comprising acetic anhydrid, glacial acetic acid, a bisulfate and free sulfuric acid, in such proportions as to produce an acetylizing agent.

9. The herein described process of producing cellulose acetate, which comprises reacting upon cellulose with an acetylizing solution containing acetic anhydrid and a condensing agent comprising a relatively large amount of a bisulfate and a relatively small amount of free sulfuric acid and thereafter treating the so obtained cellulose acetate with an acid material in presence of water until the solubilities of the product in certain organic solvents have increased, the quantity of water present having an effect on the solubilities developed, and then stopping the treatment.

10. The herein described process of producing cellulose acetate, which comprises reacting upon cellulose with an acetylizing solution containing acetic anhydrid and a condensing agent comprising a relatively large amount of a bisulfate and a relatively small amount of free sulfuric acid, cooling in a less degree being employed the less the amount of free sulfuric acid present, and even heating being employed in the case of very small quantities of free sulfuric acid; and thereafter treating the so obtained cellulose acetate with an acid material in presence of water until the solubilities of the product in certain organic solvents have increased, the quantity of water present having an effect on the solubilities developed, and then stopping the treatment.

11. The herein described process of producing cellulose acetate, which comprises reacting upon cellulose with an acetylizing solution containing acetic anhydrid and a condensing agent comprising a relatively large amount of a bisulfate and a relatively small amount of free sulfuric acid, and thereafter allowing the reaction mass to stand in presence of water, until the cellulose actetate acquires other desired solubilities, and stopping the reaction while such desired solubilities exist.

12. The herein described process of producing cellulose acetate, which comprises reacting upon cellulose with an acetylizing solution containing acetic anhydrid and a condensing agent comprising a relatively large amount of a bisulfate and a relatively small amount of free sulfuric acid, cooling in a less degree being employed the less the amount of free sulfuric acid present and even heating being employed in the case of very small quantities of free sulfuric acid; and thereafter allowing the reaction mass to stand in presence of water, until the cellulose acetate acquires other desired solubilities, the quantity of water present having an effect on the solubilities developed; and stopping the reaction while the desired solubilities exist.

13. As a new product, a cellulose acetate insoluble in chloroform alone and insoluble in chloroform upon the addition of alcohol thereto, but soluble in acetone of the necessary concentration, the solubility in acetone of a given concentration being changed by the continued action of acid-containing materials.

Testimony whereof I have hereunto subscribed my name.

Basel, 29th March, 1915.

HENRY DREYFUS.

It is hereby certified that in Letters Patent No. 1,280,974, granted October 8, 1918, upon the application of Henry Dreyfus, of Basel, Switzerland, for an improvement in "Cellulose Acetates and Processes of Making Same," errors appear in the printed specification requiring correction as follows: Page 2, line 72, for the word "clearing" read *clear;* page 3, line 75, claim 5, for the word "acetate" read *acid;* and that the said Letters Patent should be read with these corrections therein that the same may conform to the record of the case in the Patent Office.

Signed and sealed this 29th day of October, A. D., 1918.

[SEAL.]

R. F. WHITEHEAD,

*Acting Commissioner of Patents.*

Cl. 23—24.